United States Patent
Kuwahara

(10) Patent No.: US 8,423,810 B2
(45) Date of Patent: Apr. 16, 2013

(54) NETWORK INTERFACE APPARATUS

(75) Inventor: Tetsuya Kuwahara, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 282 days.

(21) Appl. No.: 13/033,440

(22) Filed: Feb. 23, 2011

(65) Prior Publication Data

US 2011/0219249 A1 Sep. 8, 2011

(30) Foreign Application Priority Data

Mar. 5, 2010 (JP) ................................ 2010-049105

(51) Int. Cl.
*G06F 1/26* (2006.01)
*G06F 1/00* (2006.01)
*G06F 15/16* (2006.01)
*G06F 13/42* (2006.01)
*H04M 1/00* (2006.01)

(52) U.S. Cl.
USPC ........... 713/320; 713/323; 713/324; 455/574; 709/227; 709/230; 710/105

(58) Field of Classification Search .................. 713/320, 713/323, 324; 455/574; 709/227, 230; 710/105
See application file for complete search history.

(56) References Cited

U.S. PATENT DOCUMENTS

| 7,474,431 B2 * | 1/2009 | Yamano et al. ............. 358/1.15 |
| 8,261,113 B2 * | 9/2012 | Yasuda ......................... 713/320 |
| 2006/0075269 A1 * | 4/2006 | Liong et al. .................. 713/300 |

FOREIGN PATENT DOCUMENTS

| JP | 2003-076451 | 3/2003 |
| JP | 2009-151537 | 7/2009 |

* cited by examiner

*Primary Examiner* — Stefan Stoynov
(74) *Attorney, Agent, or Firm* — DLA Piper LLP (US)

(57) ABSTRACT

A network interface controller includes a first NIC connected to a LAN and a second NIC, which can proceed to a low power consumption status, connected to the first NIC via a bus. The first NIC includes a storing unit arranged to store response history information transmitted from the second NIC, a registration determining unit arranged to determine whether the received data has been registered in the response history information when network data is received and the status of the second NIC is the low power consumption status, a transmitting unit arranged to transmit response data registered in association with the received data when the received data has been registered, and an activation signal transmitting unit arranged to transmit an activation signal to the second NIC when the received data has not been registered.

20 Claims, 11 Drawing Sheets

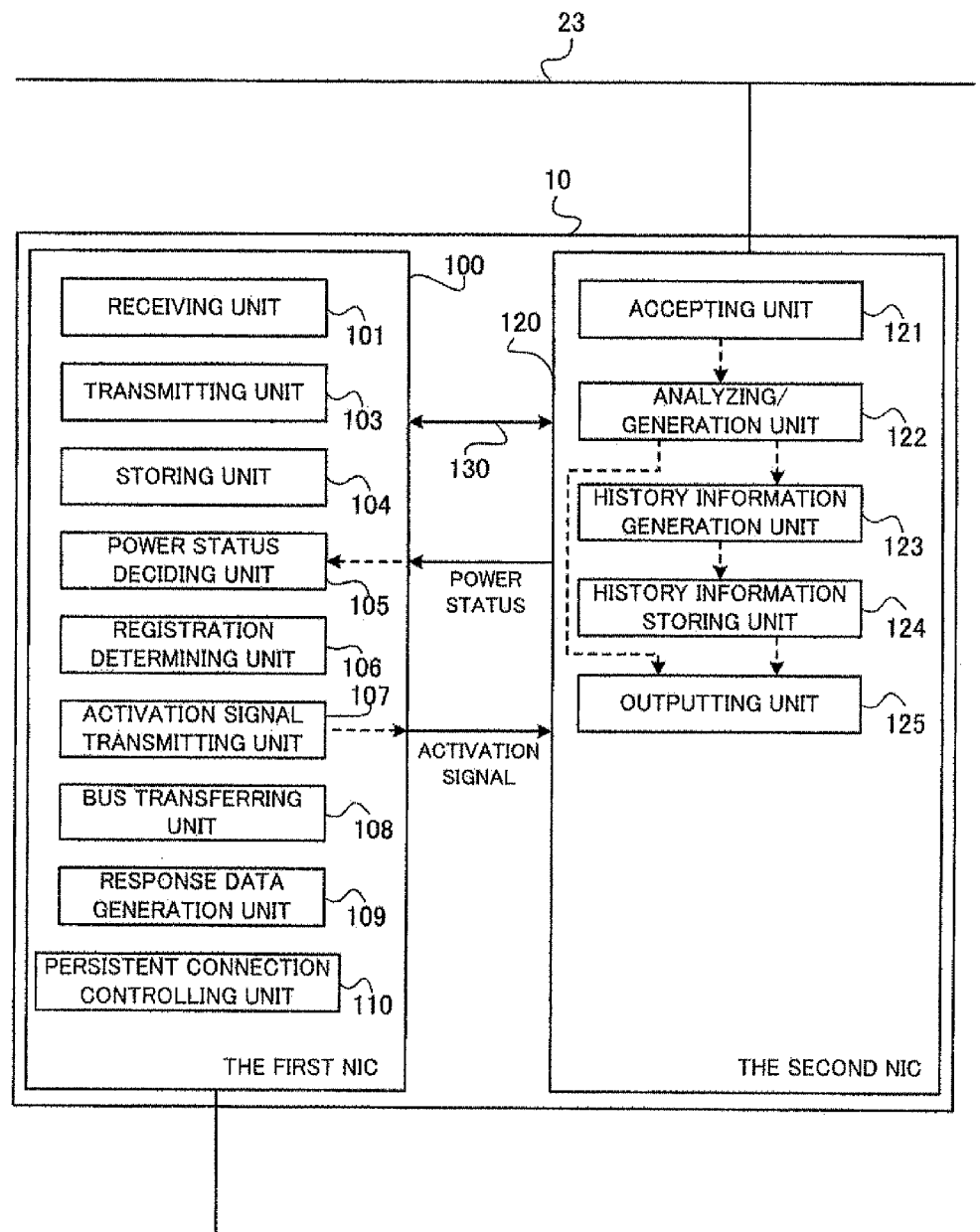

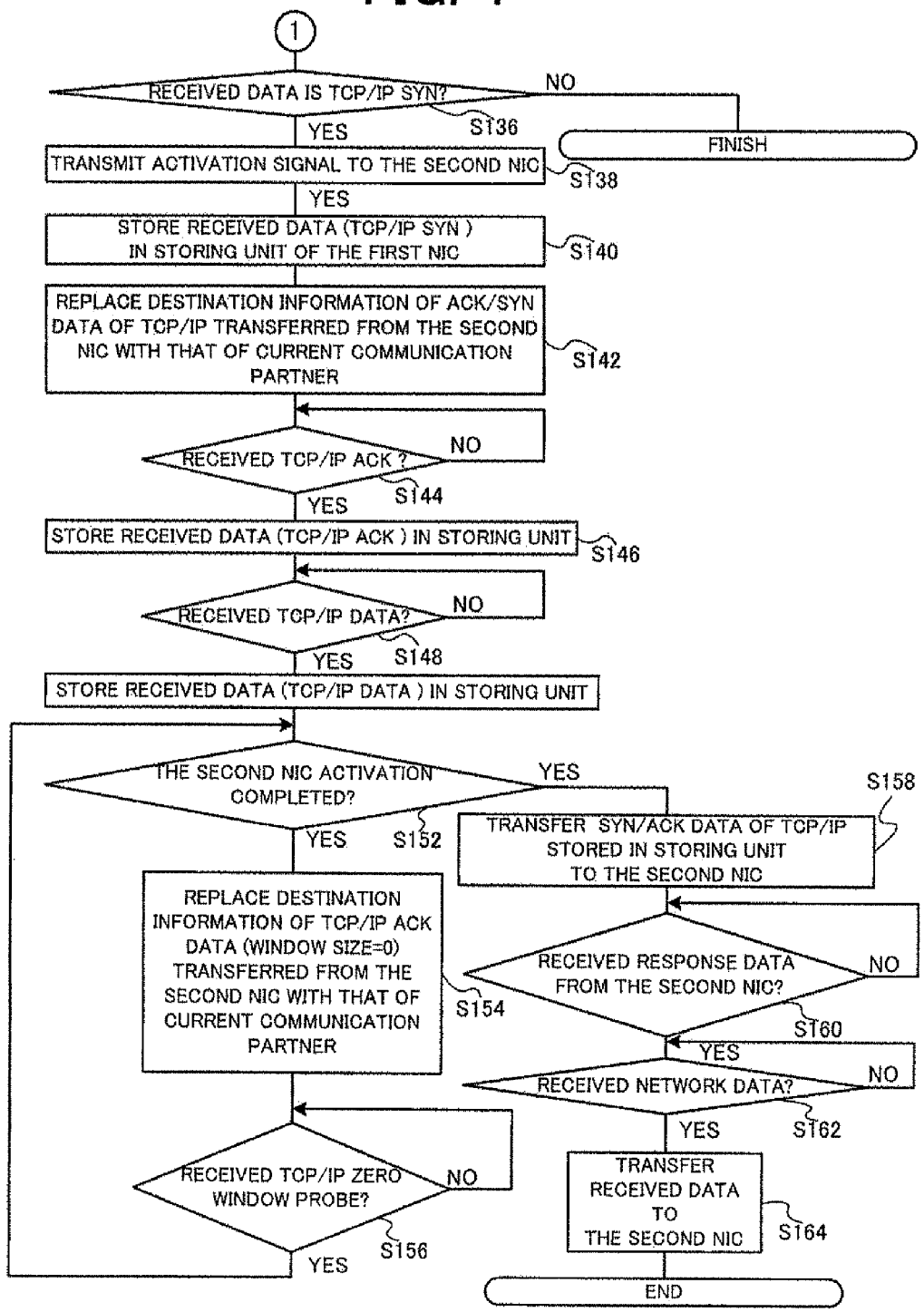

NETWORK INTERFACE APPARATUS

CROSS-REFERENCE TO RELATED APPLICATIONS

This application claims priority under 35 U.S.C. 119 to Japanese Patent Application No. 2010-049105, filed on Mar. 5, 2010, which application is hereby incorporated by reference in its entirety.

BACKGROUND OF THE INVENTION

1. Field of the Invention

The present invention relates to a network interface apparatus arranged to communicate via a network.

2. Description of the Related Art

In recent years, in view of issues such as reduction of $CO_2$ emission, lowering power consumption of electric devices has been socially demanded. For example, in a network device connected to a network such as a LAN, the network device saves power by turning off the power of a CPU or a hard disc and operating only a network interface controller (NIC) that is directly connected to the network.

In such a network device, an information processing device saves power without interfering with a low power consumption mode of units other than a network interface unit even when a status request (status transmitting request command) is transmitted from other network devices. Requests other than the status request are processed via the network with all units other than the network interface unit in a normal power mode. The network interface unit responds to the status request based on status data of the information processing device stored in a storing unit while maintaining all units other than the network interface unit in the low power consumption mode, so as to save power for the entire information processing device.

More specifically, a main CPU obtains its status by reading, for example, a register of a function block, and stores the status in a status storing unit when it is determined that no process is requested. For example, if the information processing device is a printer, a usage status of the printer can be stored. The function block and the main CPU then proceed to the low power consumption mode. Here, all units except the network interface unit are in the low power consumption mode. When the main CPU receives a request from the network device via the network while in the low power consumption mode, a sub-CPU arranged to control the network interface unit determines whether the request is a status request. When the request is not a status request, the main CPU proceeds back to the normal mode through an interrupt signal. The main CPU in the normal mode then causes the function block to proceed back to the normal mode to perform the process in response to the request. In contrast, when the request is a status request (status transmitting request command), the sub-CPU directly transmits a response (status information) to the network by referring to the status storing unit.

The above described information processing device attempts to save power of the device by keeping all units other than the network interface unit in the low power consumption mode and operating only the network interface unit while waiting. Power is saved without interfering with the low power consumption mode of units other than the network interface unit even when it receives a status request (status transmitting request command). However, since the network interface unit needs to be operative at all times to process requests transmitted from other network devices via the network, the network interface unit cannot obtain the lower power consumption mode. Therefore, it becomes difficult to save power of the network interface unit.

Further, in order to analyze the received data and determine whether it is a status request, and then to respond, the network interface unit needs to include, for example, a TCP/IP protocol stack. In order to include the TCP/IP protocol stack, the network interface unit must have a large-capacity memory to store large volumes of programs. Furthermore, in order to perform the analyzing process with the TCP/IP protocol stack, a high-speed CPU with appropriate processing power is required. Operating the large-capacity memory and high-speed CPU at all times increases the power consumption of the network interface unit.

SUMMARY OF THE INVENTION

In order to overcome the problems described above, a network interface apparatus is arranged to respond to requests from a network device at any time while reducing power consumption.

A network interface apparatus includes a first communication control unit arranged to communicate with a network device via a network and a second communication control unit configured to have both a first power status and a second power status that has a lower power consumption than the first power status and connected to the first communication control unit for communication therewith. The second communication control unit includes an accepting unit, an analyzing/generation unit, a history information generation unit and an output unit. When in the first power status, the accepting unit receives received data that has been received by the first communication control unit from the network device. The analyzing/generation unit analyzes the received data received by the accepting unit and generates response data in response to the received data. The history information generation unit generates response history information by associating the received data with the response data corresponding to the received data. The output unit outputs the response history information generated by the history information generation unit to the first communication control unit. The first communication control unit includes a receiving unit, a deciding unit, a storing unit, a determining unit and a transmitting unit. The receiving unit receives data from the network device via the network. The deciding unit determines a power status of the second communication control unit. The storing unit stores the response history information outputted from the output unit. The determining unit determines whether the received data has been registered in the response history information stored in the storing unit when the receiving unit receives the received data and the deciding unit determines that the second communication control unit is in the second power status. The transmitting unit transmits the response data registered in the response history ins association with the received data when the determining unit determines that the received data has been registered in the response history information.

The network interface apparatus may comprise the first and second communication control units separately, and, for example, while waiting, the second communication control unit proceeds to the second power status (low power consumption status, i.e. power saving mode) which has a lower power consumption and only the first communication control unit is operative to perform a standby operation for the received data. Thus, power consumption of the network interface apparatus can be reduced because the network interface apparatus can proceed to the low power consumption status, except the first communication control unit, while waiting for the received data. Further, the first communication control unit transmits response data registered in association with the received data when the received data has been registered in the response history information. That is, when the second communication control unit does not need to proceed to the first power status (not to be activated), the first communication control unit can respond to the received data on its side without activating the second communication control unit. Accordingly, such unnecessary activation of the second communication control unit is limited so as to reduce power consumption of the network interface apparatus.

Further, as described above, since the first communication control unit transmits the response data registered in association with the received data when the received data has been registered in the response history information, there is no need to analyze the received data or generate the response data. Accordingly, a large-capacity memory to store, for example, a TCP/IP protocol stack or a response processing program is not necessary. Furthermore, a CPU with a low frequency of operation clock and a relatively slow processing speed can be used. Therefore, power consumption of the first communication control unit can be reduced. As a result, it is possible to respond to a communication request from the network device at any time while saving power.

Further, when the determining unit determines that the received data has not been registered in the response history information, the first communication control unit may include a proceeding unit arranged to transmit a proceeding signal that causes the second communication control unit to proceed to the first power status.

In the above case, when the received data has not been registered in the response history information, i.e., when the first communication control unit cannot respond, the second communication control unit proceeds to the first power status to processes the received data. Accordingly, the second communication control unit can analyze the received data and perform, for example, a response processing according to the analysis result. Further, the result is newly registered in the response history information.

According to the network interface apparatus, the history information generation unit generates an error-correction code for the received data and response history information by associating the error-correction code with the response data corresponding to the received data. The determining unit may calculate the error-correction code for the received data received by the receiving unit and determine whether the received data has been registered by comparing the calculated error-correction code with the error-correction code registered in the response history information stored in the storing unit.

In the above case, by calculating the error-correction code for the received data, comparing it with the error-correction code registered in the response history information, and determining whether the two codes correspond to each other, it is determined whether the received data has already been registered in the response history information. That is, it is possible to determine whether the received data has already been registered in the response history information without comparing the received data with the stored received data one by one. Accordingly, since the processing load for determining whether the received data has already been registered in the response history information is reduced, a CPU with a lower frequency of operation clock and a slower processing speed can be used. As a result, power consumption of the first communication control unit can be further reduced.

Further, according to the network interface apparatus, the second communication control unit may include a history storing unit arranged to temporarily store the response history information generated by the history information generation unit, and the output unit may output the response history information stored in the history storing unit to the first communication control unit when the second communication control unit proceeds to the second power status.

Thus, the first communication control unit can obtain only the response history information generated just before the second communication control unit proceeds to the second power status. Therefore, after the second communication control unit proceeds to the second power status, it is possible to transmit the response data to the network device based on the response history information obtained just before the second communication control unit proceeds to the second power status.

According to the network interface apparatus, the first communication control unit, when the receiving unit has received a session establishing request signal and the proceeding unit has transmitted the proceeding signal, may further include a persistent connection control unit arranged to establish a session with the network device and perform a persistent connection control that restricts data transmission of the network device while maintaining the session during the period of time in which the second communication control unit proceeds to the first power status.

In the above case, during the period of time in which the second communication control unit proceeds to the first power status in which received data can be processed, data transmission of the network device is restricted, while the session is maintained. Therefore, a large-capacity memory in the first communication control unit to temporarily store the received data is not necessary, power consumption of the memory can be further reduced. Further, when the persistent control is deactivated, the session has been already established. Therefore, data communications can be initiated quickly.

It is possible to respond to the communication request from the network device at any time while reducing power consumption.

Other features, elements, processes, steps, characteristics and advantages of the invention will be more apparent from the following detailed description of preferred embodiments with reference to the attached drawings.

BRIEF DESCRIPTION OF THE DRAWINGS

FIG. 2 is a block diagram illustrating the configuration of the network interface apparatus.

FIG. 4 is a flow diagram (the second page) illustrating a procedure of the communication process by the first NIC.

DETAILED DESCRIPTION OF PREFERRED EMBODIMENTS

Figure 1:
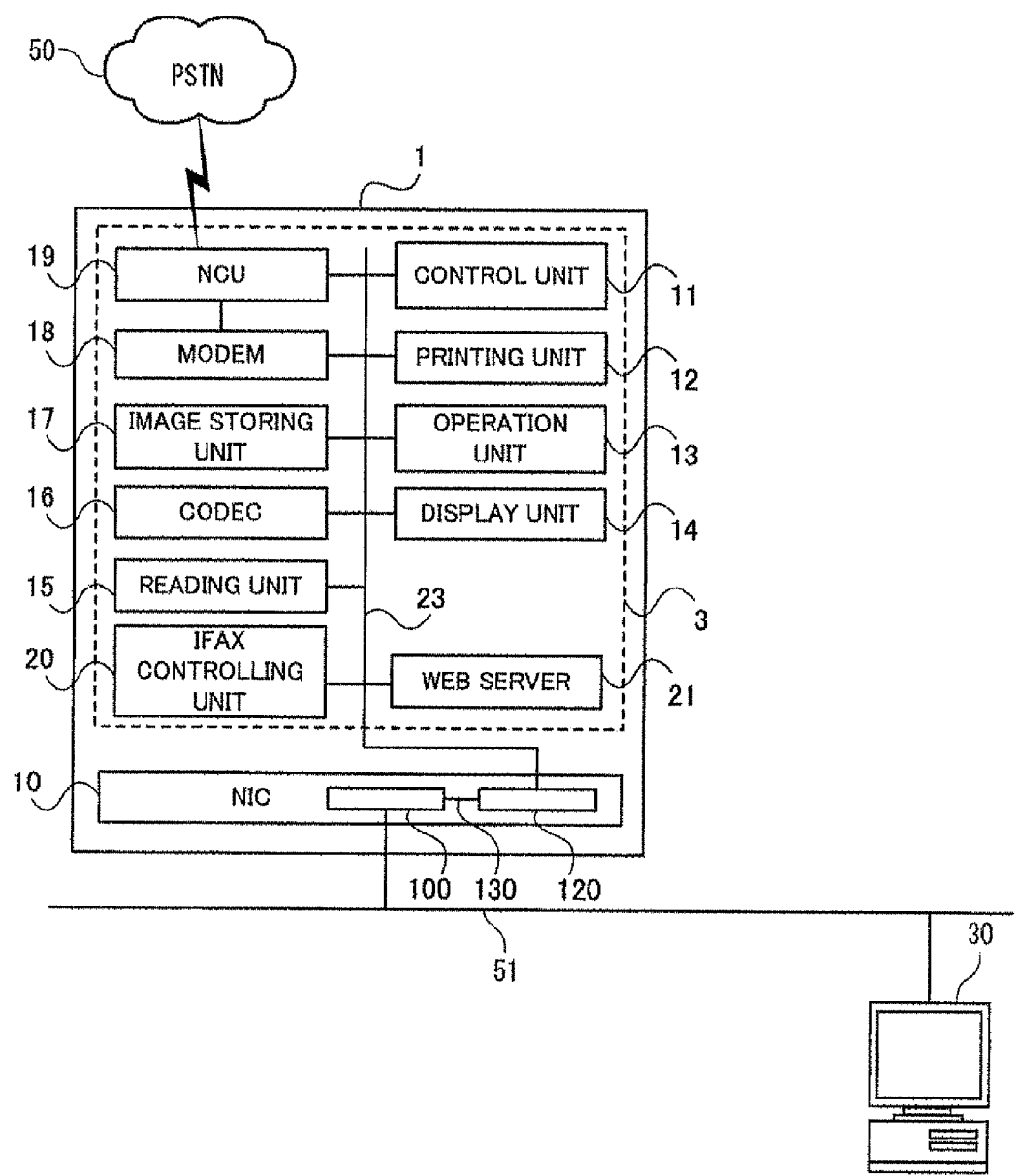
FIG. 1 is a block diagram illustrating an entire configuration of the network multi function peripheral with a network interface apparatus according to an embodiment.

Preferred embodiments are now described with reference to the drawings. In the drawing figures, like reference numerals refer to like parts, unless otherwise indicated. An MFP (Multi Function Peripheral) equipped with a network interface apparatus according to an embodiment, i.e. a network MFP, is described as an example. Further, a network system in which a network MFP is connected to a personal computer as a network device via a LAN is described as an example. The network system illustrated as an example is simplified to facilitate understanding of the configuration. Now, with reference to FIG. 1 and FIG. 2, the configuration of a network MFP 1 and a network interface controller (network interface apparatus, hereinafter: NIC) 10 is described. FIG. 1 is a block diagram illustrating an entire configuration of the network MFP 1 connected to a LAN 51. FIG. 2 is a block diagram illustrating the configuration of the NIC 10.

The network MFP 1 has an energy saving status while waiting, and includes a scanner function to read a document and generate image data, a copy function to form image data which is read and generated on a paper, a facsimile receiving function to record image data received by facsimile communication on paper, and a PC printing function to print image data received from a PC 30 connected thereto via a LAN 51 on paper. The network MFP 1 also includes a facsimile transmission function to perform facsimile transmission of read image data, and a PC-FAX function to perform facsimile transmission of image data received from the external PC 30. Further, the network MFP 1 includes an internet facsimile (IFAX) function to transmit and receive image data by e-mail via an IP network. In order to perform these functions, the network MFP 1 includes an MFP 3 and a NIC 10 arranged to connect the MFP 3 to the LAN 51. The MFP 3 includes a control unit 11, a printing unit 12, an operation unit 13, a display unit 14, a reading unit 15, a codec 16, an image storing unit 17, a modem 18, a NCU 19, an IFAX control unit 20 and a web server 21. These units are all connected to a bus 23 in order to be in communication with each other.

The NIC 10 is a network interface arranged to perform transmitting-receiving control of each communication protocol, and data analysis and data generation of each communication protocol. Data communication with the PC 30 connected thereto via the LAN 51 is performed through the NIC 10. As illustrated in FIG. 2, the NIC 10 includes a front-end unit (first communication control unit, hereinafter: first NIC) 100 arranged to receive network packets (network data), and a back-end unit (second communication control unit, hereinafter: second NIC) 120 arranged to perform analysis of the received data, generation of response data, and other processes corresponding to each application.

The first NIC 100 is connected, for example, to the PC 30 via the LAN 51 to communicate with the PC 30. The second NIC 120 is connected to the first NIC 100, for example, via the bus 130 such as PCI (Peripheral Component Interconnect) or PCI Express, to communicate therewith. The second NIC 120 can proceed to a normal power status (first power status) during operation and proceeds to a low power consumption status (second power status) while waiting. Even while waiting, i.e. the MFP 3 and the status of the second NIC 120 is the low power consumption status, power is supplied to the first NIC 100. The first NIC 100 and the second NIC 120 can be connected to communicate with each other via, for example, serial communication or a USB, instead of the PCI bus 130.

The first NIC 100 includes a microprocessor arranged to perform calculations, a ROM arranged to store a program that causes the microprocessor to perform various processes, a communication integrated circuit (IC) arranged to perform communications under control of the microprocessor, and a RAM arranged to temporarily store data that has been received by and then read out from the communication integrated circuit and other data such as a calculation result. The first NIC 100 may include a microcomputer in a single chip in which the microprocessor, the communication integrated circuit, the ROM and the RAM are included. The microprocessor of the first NIC 100 preferably has, for example, a lower operation clock frequency and lower power consumption than that of the second NIC 120. The memory such as the RAM of the first NIC 100 preferably has a smaller capacity and lower power consumption than that of the second NIC 120.

As illustrated in FIG. 2, the first NIC 100 includes a receiving unit 101, a transmitting unit 103, a storing unit 104, a power status deciding unit 105, a registration determining unit 106, an activation signal transmitting unit 107, a bus transferring unit 108, a response data generation unit 109 and a persistent connection control unit 110, through a combination of the above described hardware and software.

The receiving unit 101 receives network packets (network data), for example, from the PC 30 via the LAN 51. The storing unit 104, including the RAM, is arranged to store a response history information outputted from an output unit 125 of the second NIC 120. Further details of the response history information are described later. The storing unit 104 stores received data received before the second NIC 120 is activated. For example, the storing unit 104 stores a TCP/IP SYN signal, an ACK signal, and other data.

A power status deciding unit 105 determines the power status of the second NIC 120 based on the level (Hi or Low) of a port connected to the second NIC 120. More specifically, the power status deciding unit 105 determines that the status is the normal power status (normal mode) when the port level is Hi (5V) and is the low power consumption status (power saving mode) when the port level is Low (0V).

The registration determining unit 106, when the network data is received by the receiving unit 101 and the power status deciding unit 105 determines that the second NIC 120 has the low power consumption status, determines whether the received data has been registered in the response history information stored in the storing unit 104. More specifically, the registration determining unit 106 calculates a 32-bit CRC (cyclic redundancy check) (error-correction code, hereinafter: CRC) received by the receiving unit 101 and, by comparing the calculated CRC with a 32-bit CRC of automatic response data registered in the response history information stored in the storing unit 104, determines whether the received data has been registered as the automatic response data.

Such automatic response data can be SNMP (Simple Network Management Protocol) data for monitoring and controlling the network device via the network. The network MFP 1 transmits information of its status, such as a current accumulation of jobs, a presence or absence of paper in a paper feed cassette or a presence of absence of toner, in response to a status request by the SNMP. Further, for example, ICMP (internet control message protocol) data for transferring an error message or a control message of an IP (Internet Protocol), or ARP (Address Resolution Protocol) data for inquiring a MAC address, may also be set as the automatic response data.

The activation signal transmitting unit 107 (proceeding unit) transmits an activation signal (proceeding signal) that causes the second NIC 120 to proceed from the low power consumption status to the normal power status when the registration determining unit 106 determines that the received data has not been registered in the response history information, i.e. the second NIC 120 needs to be activated. When the activation signal is transmitted from the activation signal transmitting unit 107, power supply to the second NIC 120 is initiated. An activation process, such as loading a program, is then performed to activate the second NIC 120. At the time of completing the activation of the second NIC 120, the above described port level is set to Hi.

The bus transferring unit 108 transfers the received data which has been received before the second NIC is activated and stored in the storing unit 104, to the second NIC 120 via the bus 130, when it is determined that the second NIC 120 has proceeded from the low power consumption status to the normal power status (when activated). The bus transferring unit 108 transfers the data received by the receiving unit 101 to the second NIC 120 via the bus 130 when the second NIC 120 is in the normal power status.

The response data generation unit 109 generates response data in response to data received by the receiving unit 101 when the second NIC 120 does not need to be activated. For example, the response data generation unit 109 generates response data in response to data such as ICMP and ARP. The response data generated by the response data generation unit 109 is transmitted to the transmitting unit 103. Whether the second NIC 120 needs to be activated is determined based on whether the data can be responded only by the first NIC 100.

The transmitting unit 103, when the status of the second NIC 120 is the low power consumption status and the registration determining unit 106 determines that the received data has been registered in the response history information, transmits the response data registered in the response history information in association with the received data (the CRC) to the LAN 51. The transmitting unit 103 transmits the response data received from the second NIC 120 via the bus 130 to the LAN 51 when the second NIC 120 is in the normal power status. The transmitting unit 103 transmits the response data generated by the response data generation unit 109 to the LAN 51.

The persistent connection control unit 110, when a session establishing request signal (TCP/IP data) is received from the network device (PC 30 for example) by the receiving unit 101 and also when an activation signal is transmitted by the activation signal transmitting unit 107, establishes a session with the network device and performs persistent connection control (keep alive control) that restricts data transmission of the network device during a period of time in which the second NIC 120 proceeds from the low power consumption status to the high power consumption status while maintaining the session.

More specifically, the persistent connection control unit 110, when performing persistent connection control, transmits an ACK (win=0) in which windows size is zero, to the network device (PC 30 for example). When the ACK (win=0) is transmitted, an originating host regularly transmits a TCP Zero Window Probe (win=0), which is a signal for inquiring whether a receive buffer has free space. When the first NIC 100 transmits a TCP Zero Window Probe ACK (win=0), which indicates that the receive buffer has no free space, in response to the signal, the persistent connection control is maintained. In other words, while the persistent connection control is performed, the TCP Zero Window Probe ACK (win=0) is transmitted in response to the TCP Zero Window Probe (win=0). The persistent connection control unit 110 allows the network device to transmit data when the second NIC 120 is in the normal power status. When the second NIC 120 has proceeded from the low power consumption status to the normal power status (is activated), the persistent connection control unit 110 deactivates the persistent connection control and allows the network device (PC 30), which has transmitted the session establishing request signal, to transmit data.

The second NIC 120 includes a microprocessor arranged to perform calculations, a ROM arranged to store a program that causes the microprocessor to perform various processes, a RAM arranged to temporarily store various data such as the received data transferred from the first NIC 100 and a result of a calculation, and a back up RAM arranged to store back up data. The second NIC 120 may include a microcomputer in a single chip in which the microprocessor, the ROM and the RAM are included. The microprocessor of the second NIC 120 has a higher operation clock frequency and a faster processing speed than that of the first NIC 100. The memory such as the RAM of the second NIC 120 has a larger capacity than that of the first NIC 100.

The second NIC 120 includes an accepting unit 121, an analyzing/generation unit 122, a history information generation unit 123, a history information storing unit 124 and an output unit 125, through a combination of the above described hardware and software. The accepting unit 121, when the second NIC 120 is in the normal power status, accepts the received data, which has been received from the network device (PC 30 for example) by the first NIC 100 and transferred from the bus transferring unit 108, via the bus 130. The received data accepted by the accepting unit 121 is transmitted to the analyzing/generation unit 122 and the history information generation unit 123.

The analyzing/generation unit 122 analyzes the received data accepted by the accepting unit 121 and generates response data in response to the received data. The response data generated by the analyzing/generation unit 122 is transmitted to the history information generation unit 123.

The history information generation unit 123 generates response history information by associating the received data transmitted from the accepting unit 121 with the response data transmitted from the analyzing/generation unit 122. More specifically, the history information generation unit 123 calculates a 32-bit CRC of the received data and generates the response history information by associating the CRC with the response data.

The history information storing unit 124 includes a RAM to temporarily store the response history information generated by the history information generation unit 123.

The output unit 125 outputs the response data generated by the analyzing/generation unit 122 and the response history information generated by the history information generation unit 123 to the first NIC 100 via the bus 130. The output unit 125 outputs the response history information stored in the history information storing unit 124 to the first NIC 100 when the second NIC 120 proceeds to the low power consumption status.

The second NIC 120 is turned off when no communication is performed continuously for more than a prescribed period of time and proceeds to the low power consumption status. On the other hand, as described above, when receiving the activation signal transmitted from the activation signal transmitting unit 107, power supply to the second NIC 120 is initiated and the second NIC 120 proceeds to the normal power status.

The description is continued with reference to FIG. 1. The control unit 11 of the MFP 3 includes a microprocessor to perform calculations, a ROM to store programs that cause the microprocessor to perform various processes, a RAM to temporarily store various data such as a result of a calculation, and a back up RAM to store back up data. The control unit 11 comprehensively controls the hardware of the MFP 3 by running the programs stored in the ROM.

The printing unit 12 is an electrophotographic printer arranged to print out on paper image data received from the external PC 30. Further, the printing unit 12 prints out on paper image data read and generated by the reading unit 15 and image data received by, for example, a FAX and an IFAX.

The operation unit 13 includes multiple keys, such as a numeric keypad, a shortcut key, a start key, a stop key and other function keys, so as to perform various functions of the network MFP 1. The display unit 14 is a display device with, for example, an LCD to display an operation status and/or various settings of the network MFP 1. The reading unit 15 includes a light source and a CCD to read each line of a document according to a sub scanning line density and generates image data.

The codec 16 encodes/compresses the image data read by the reading unit 15 and decodes the encoded and compressed image data. The image storing unit 17 includes a DRAM to store image data encoded and compressed by the codec 16, image data received through a FAX, and image data that has been received from the external PC 30 and then encoded/compressed.

The modem (modulator and demodulator) 18 performs modulations/demodulations between a digital signal and an analog signal. Further, the modem 18 generates and detects function information such as a digital command signal (DCS). An NCU (network control unit) 19 is connected to the modem 18 to control the connection between the modem 18 and a public switched telephone network (PSTN) 50. The NCU 19 transmits a call signal corresponding to a facsimile number of a destination and detects a received call.

The IFAX control unit 20 includes an internet-based IFAX function. The IFAX control unit 20 includes a transmitting function of email according to SMTP (simple mail transfer protocol) and a receiving function of email according to POP (post office protocol). The IFAX control unit 20 attaches an outgoing draft to an email as image data in, for example, a TIFF format and transmits the email with the attached outgoing draft to an email address (SMTP server). Further, the IFAX control unit 20 receives emails from a POP server at prescribed time intervals and prints out the attached files therein. The web server 21, for example, enables prescribed HTTP tasks to data such as a home page written in HTML format, a log-in page, and a facsimile operation page, to be performed with access from the PC 30.

Figure 3A:
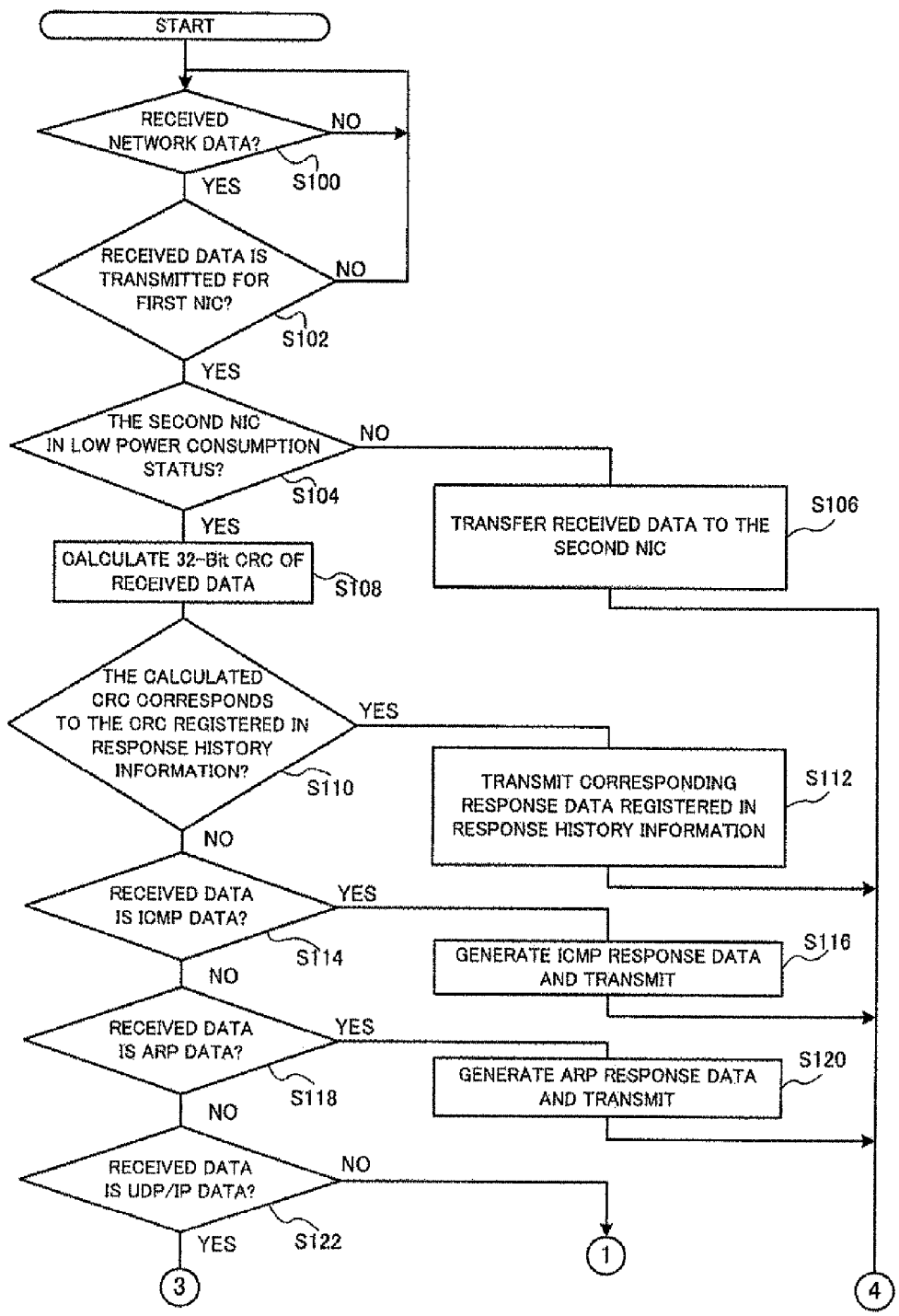
FIG. 3A and FIG. 3B are flow diagrams (the first page) illustrating a procedure of a communication process by the first NIC.
Figure 3B:
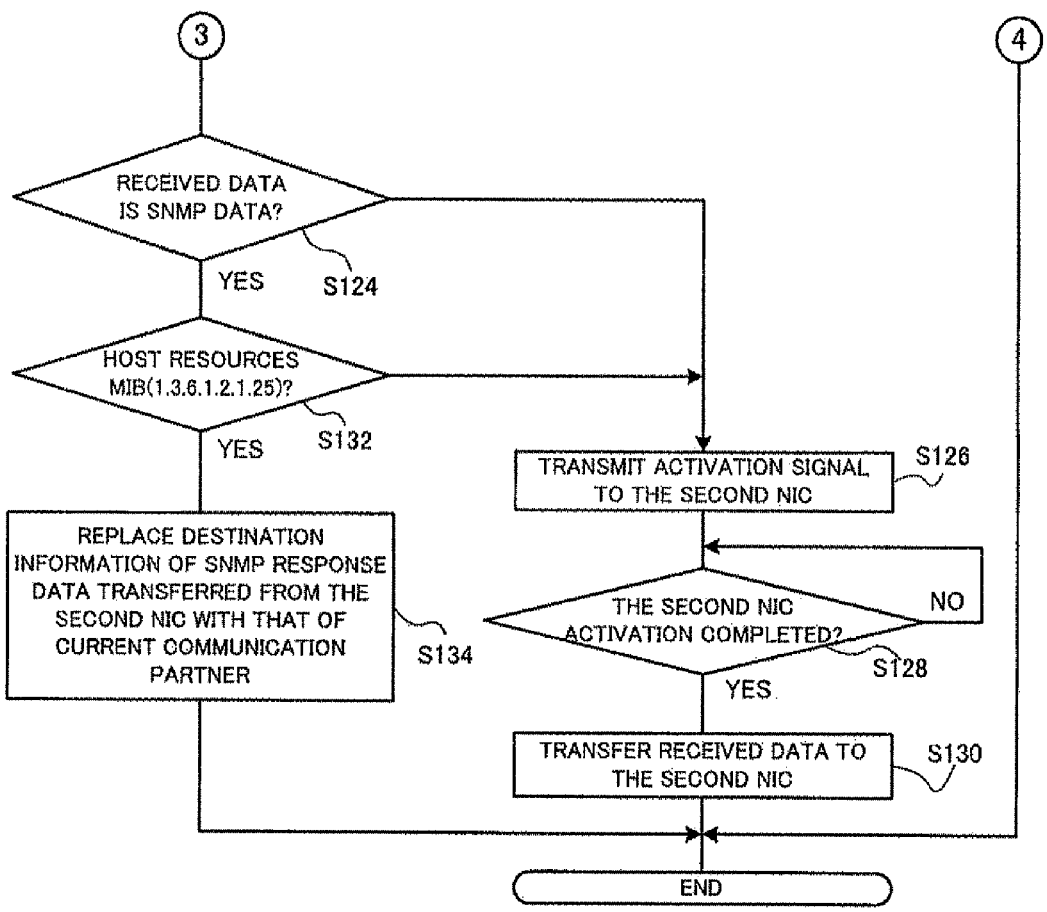
Figure 5:
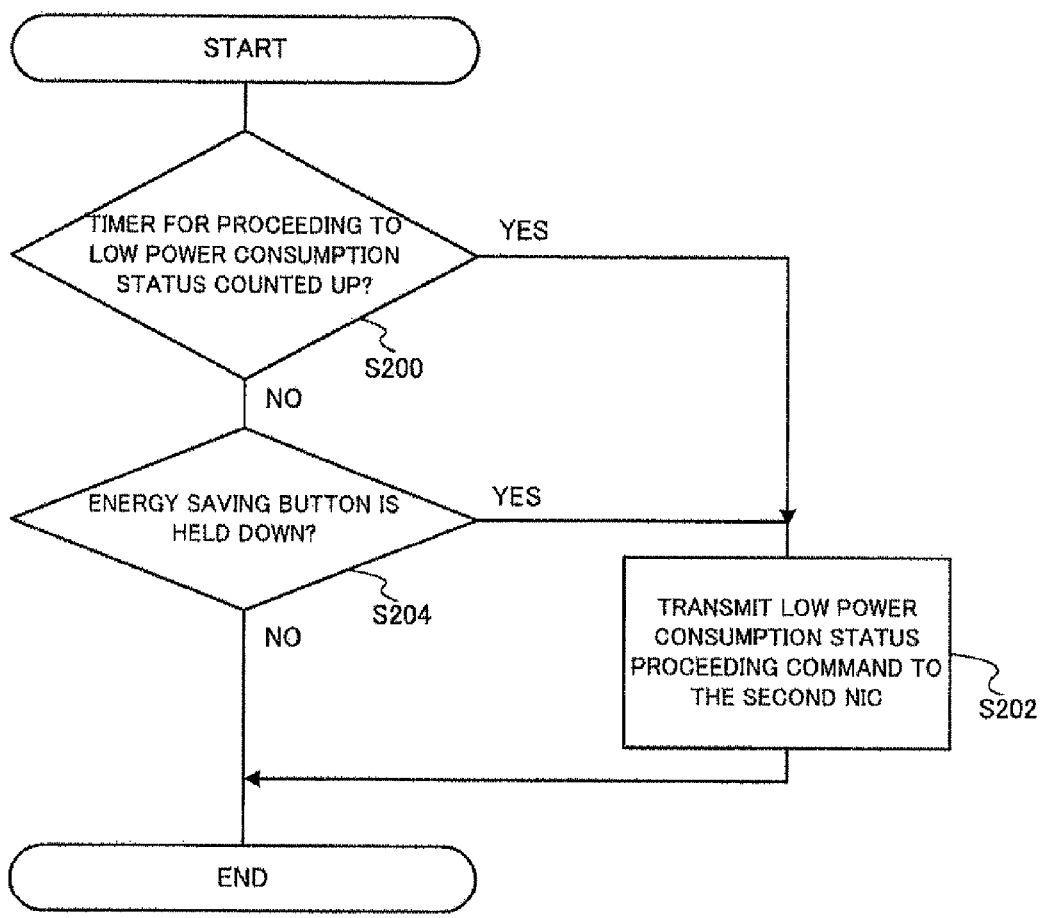
FIG. 5 is a flow diagram illustrating a procedure of a command transmitting process to the second NIC by a multi function peripheral.
Figure 6:
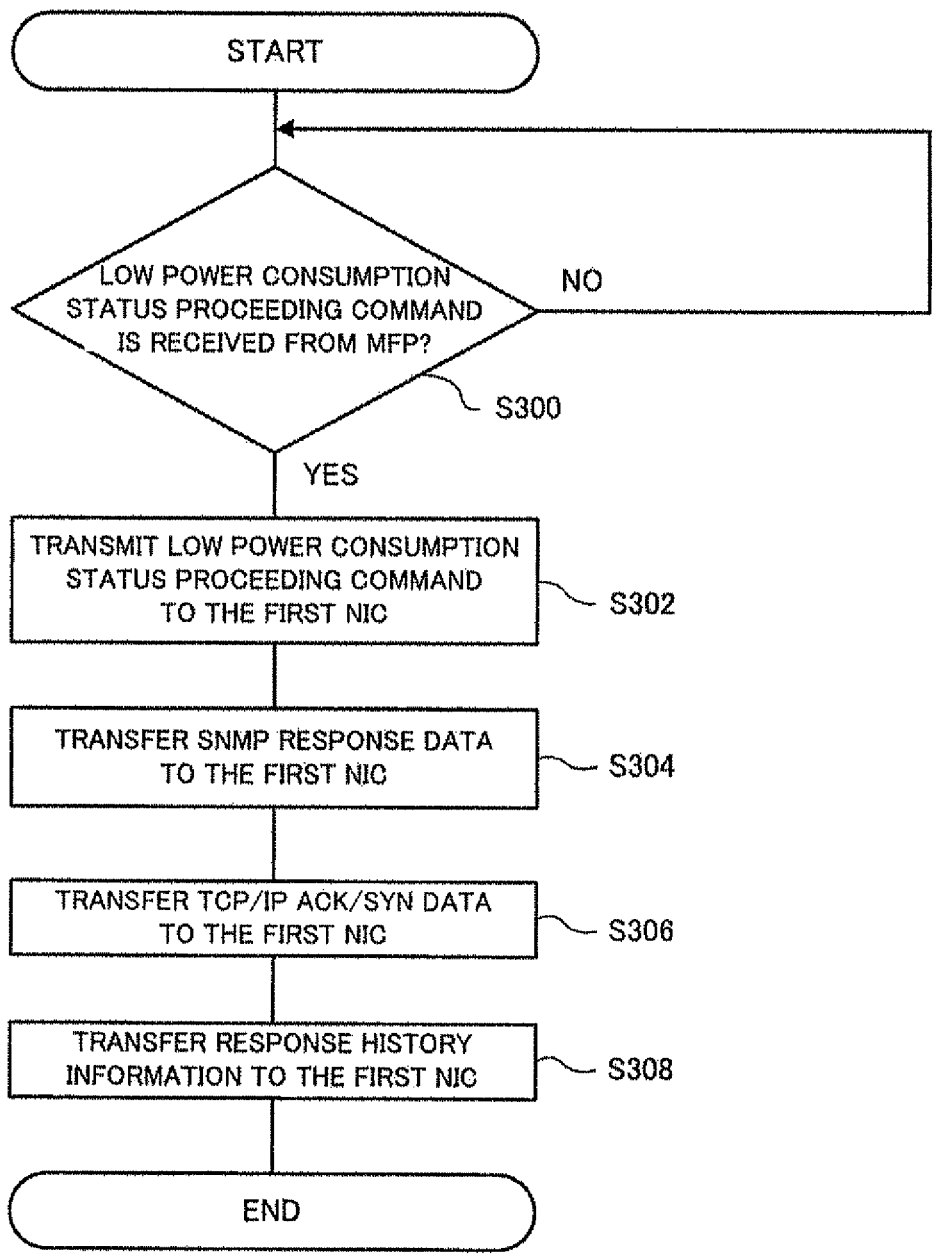
FIG. 6 is a flow diagram illustrating a procedure of a command and data transmitting process to the first NIC by the second NIC.
Figure 7:
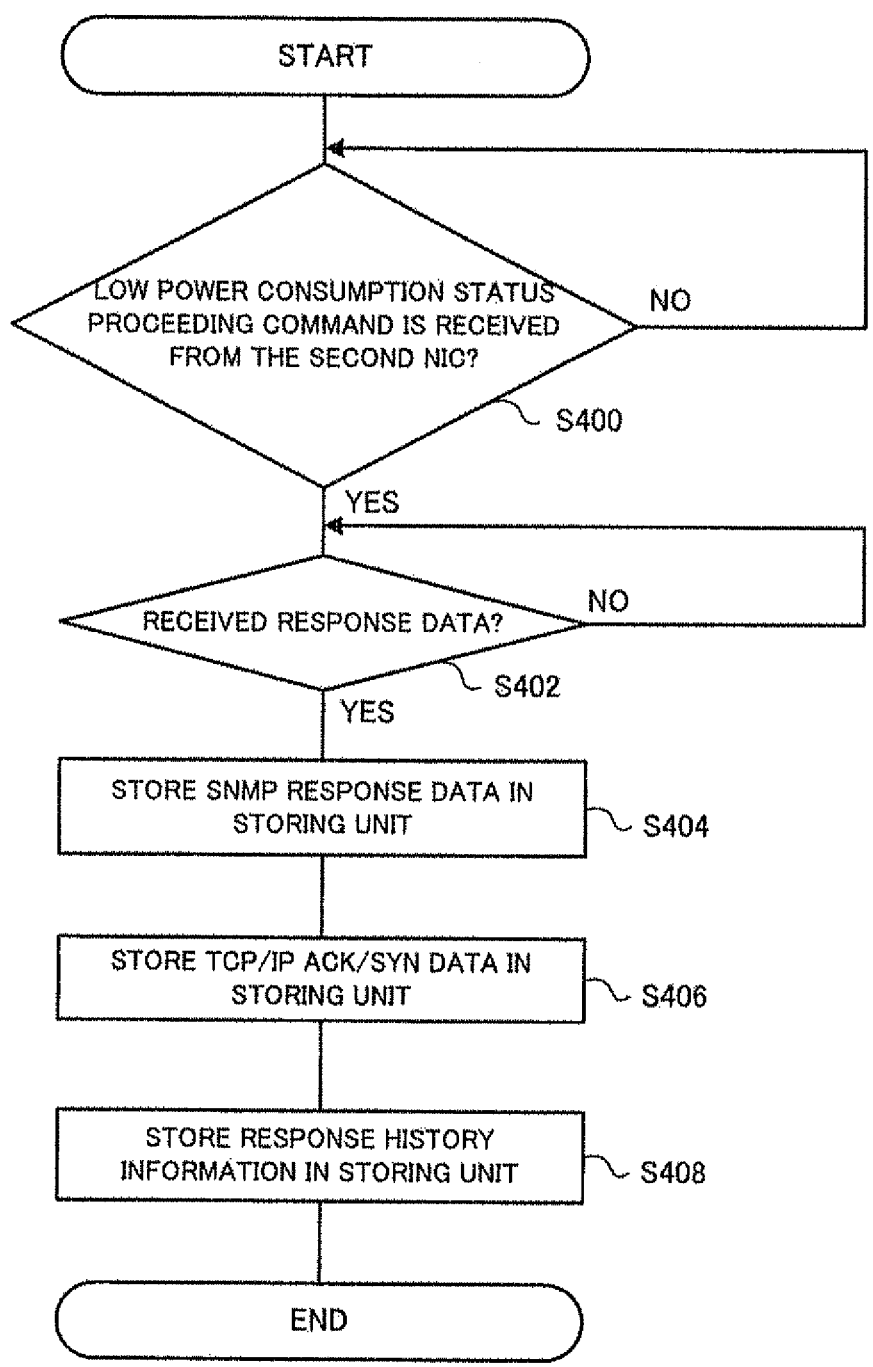
FIG. 7 is a flow diagram illustrating a procedure of a command and data receiving process from the second NIC by the first NIC.
Figure 8:
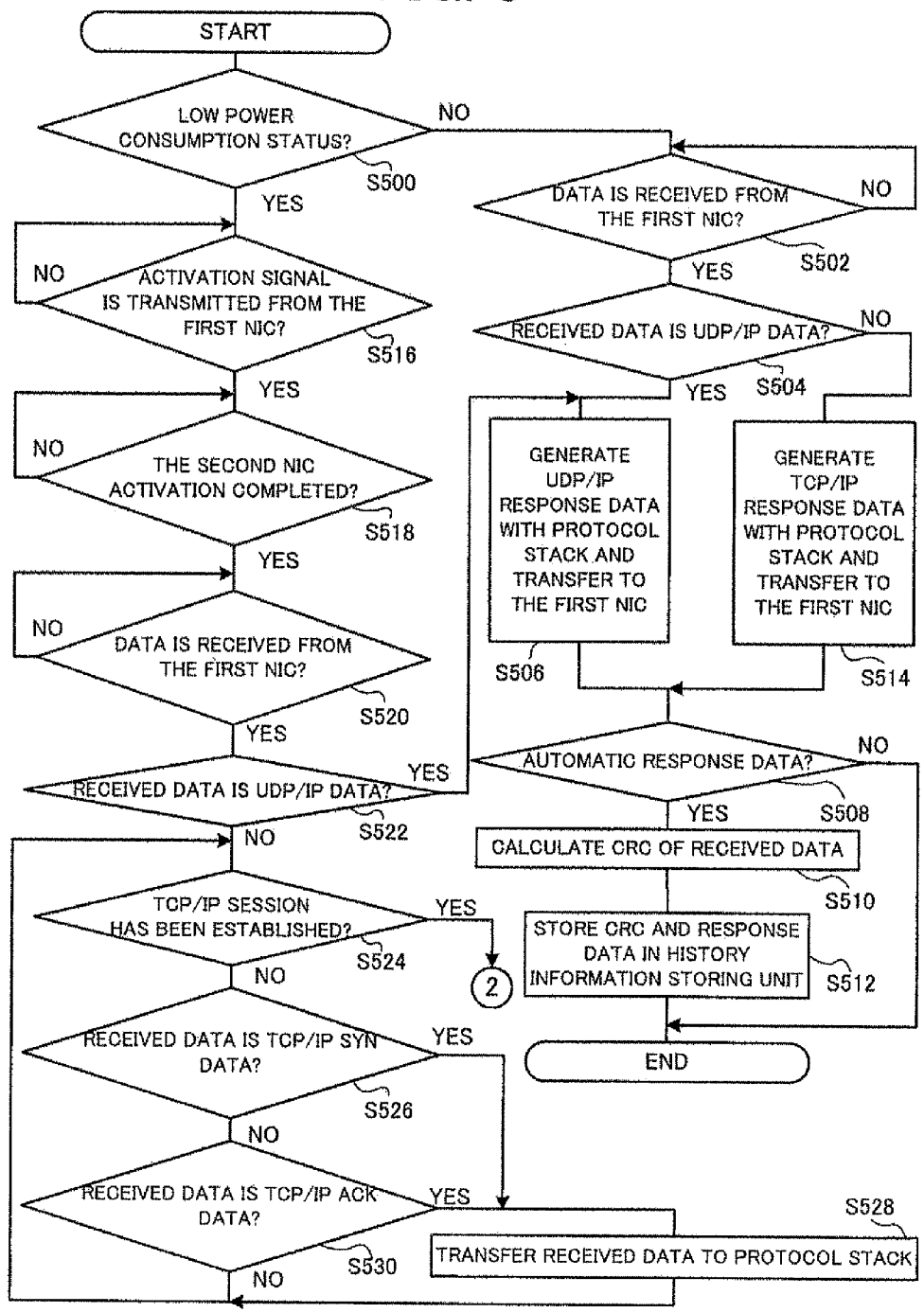
FIG. 8 is a flow diagram (the first page) illustrating a procedure of a data receiving process from the first NIC by the second NIC.
Figure 9:
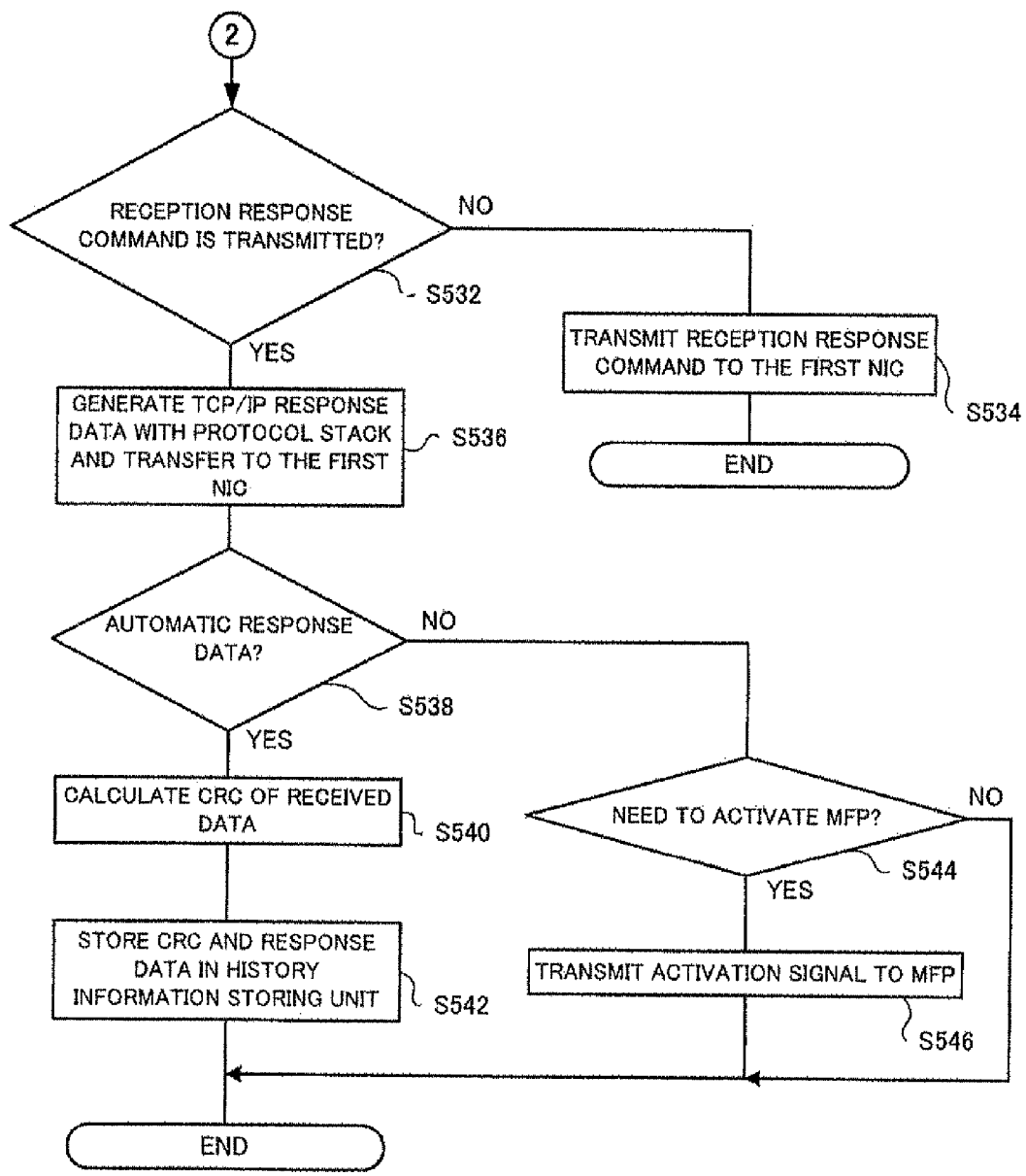
FIG. 9 is a flow diagram (the second page) illustrating the procedure of the data receiving process from the first NIC by the second NIC.
Figure 10:
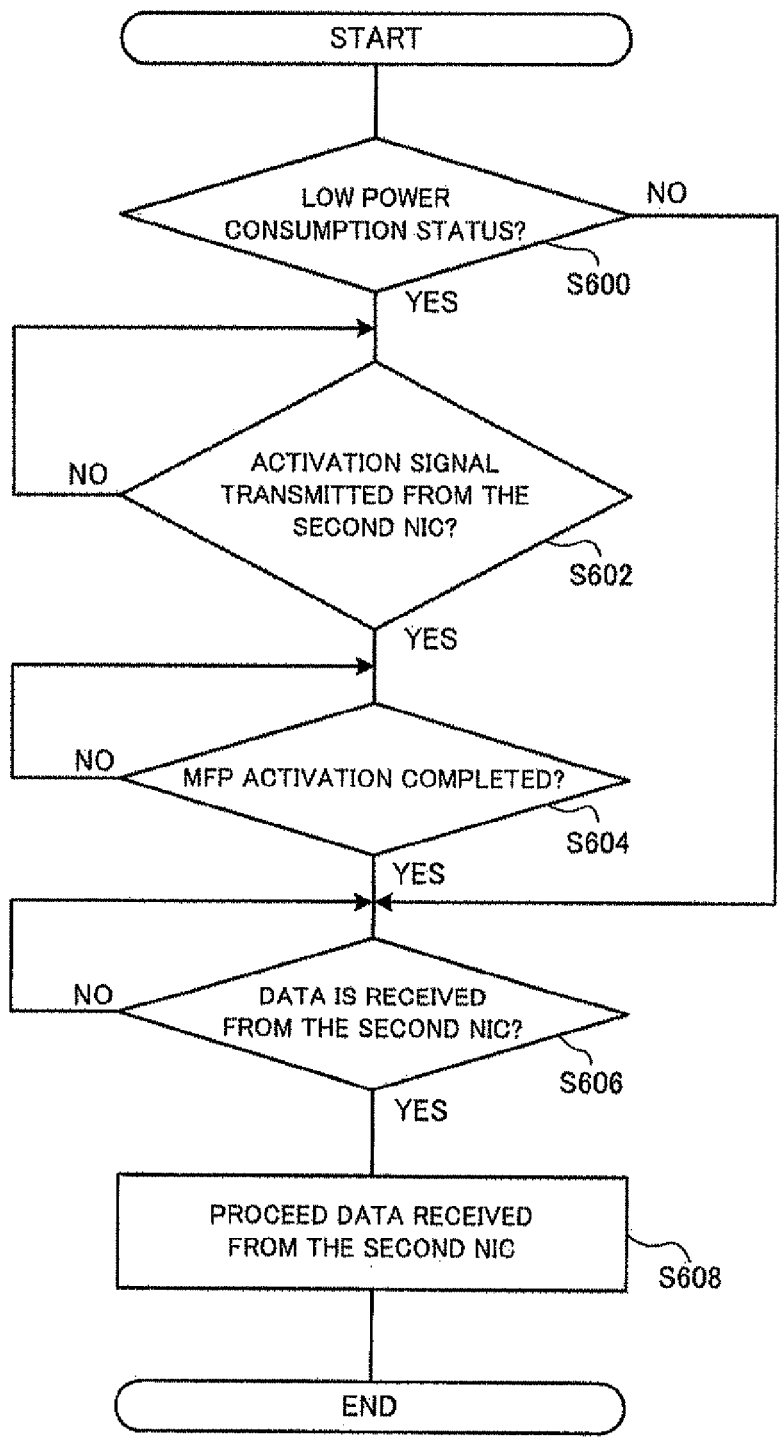
FIG. 10 is a flow diagram illustrating a procedure of a command and data receiving process from the second NIC by the multi function peripheral.

Next, with reference to FIGS. 3A and 3B through FIG. 10, a communication process by the network MFP 1 is described. FIGS. 3A, 3B and 4 are flow diagrams illustrating a procedure of the communication process by the first NIC 100. FIG. 5 is a flow diagram illustrating a procedure of a command transmitting process to the second NIC 120 by the MFP 3. FIG. 6 is a flow diagram illustrating a command and data transmitting process to the first NIC 100 by the second NIC 120. FIG. 7 is a flow diagram illustrating a command and data receiving process from the second NIC 120 by the first NIC 100. FIGS. 8 and 9 are flow diagrams illustrating a procedure of the data receiving process from the first NIC 100 by the second NIC 120. FIG. 10 is a flow diagram illustrating a command and data receiving process from the second NIC 120 by the MFP 3.

With reference to FIGS. 3A, 3B and 4, a communication process by the first NIC 100 is first described. The process is performed at a prescribed timing in the first NIC 100.

In step S100, it is determined whether network data is received. When network data is received, the process continues to step S102. When network data is not received, step S100 is repeated until it is received.

In step S102, it is determined whether the received data is transmitted for the first NIC 100, more specifically, whether destination information of an Ethernet frame of the received data is for the first NIC 100. When the received data is transmitted for the first NIC 100, the process continues to step S104. When the received data is not transmitted for the first NIC 100, the process proceeds to step S100, and steps S100 and S102 are then repeated until received data transmitted for the first NIC 100 is received.

In step S104, it is determined whether the power status of the second NIC 120 is the low power consumption status. When the power status of the second NIC 120 is not the low power consumption status (i.e. normal power status), the process proceeds to step S106 and the received data is transferred to the second NIC 120. The process then ends. When the power status of the second NIC 120 is the low power consumption status, the process continues to step S108.

In step S108, a 32-bit CRC of the received data is calculated. In step S110, it is determined whether the calculated CRC corresponds to a CRC of automatic response request data registered in the response history information stored in the storing unit 104: When the calculated CRC does not correspond to the CRC in the response history information, the process continues to step S114. When request data that corresponds to the CRC has been registered, the process continues to step S112. In step S112, stored response data associated with the request data with the corresponding CRC is transmitted to an originating host (PC 30 for example) of the request data, and then the process ends.

When the calculated CRC does not correspond to the CRC in the response history information, in step S114, it is determined whether the received data is ICMP data. When the received data is ICMP data, the process proceeds to step S116 and ICMP response data is generated and transmitted. The ICMP data can be used as automatic response data. When the received data is not ICMP data, the process continues to step S118.

In step S118, it is determined whether the received data is ARP data. When the received data is ARP data, the process proceeds to step S120 and APR response data is generated and transmitted. The ARP data can be used as automatic response data. When the received data is not ARP data, the process continues to step S122.

In step S122, it is determined whether the received data is UDP/IP data. When the received data is not UDP/IP data, the process continues to step S136 as illustrated in FIG. 4. When the received data is UDP/IP data, the process continues to step S124.

In step S124, it is determined whether the received data is SNMP data. When the received data is not SNMP data, the process continues to step S126. When the received data is SNMP data, the process continues to step S132.

In step S126, an activation signal is transmitted to the second NIC 120 and power supply thereto is initiated. In step S128, it is determined whether an activation of the second NIC 120 has been completed, i.e. whether the second NIC 120 has proceeded to the normal power status. When the activation of the second NIC 120 has not been completed, step S128 is repeated until it is completed. When the activation of the second NIC 120 has been completed, the process proceeds to step S130 and the received data (UDP/IP data in this case) is transferred to the second NIC 120. The process then ends.

In step S124, when it is determined that the received data is SNMP data, the process proceeds to step S132, where it is determined whether a range of items requested by the requesting host is within a prescribed range. More specifically, it is determined whether a search range of a Host Resources MIB is within (1.3.6.1.2.1.25). When the answer in step S132 is affirmative, the process proceeds to step S134 and destination information of SNMP data response data (response data already transmitted as response data of SNMP) transferred from the second NIC 120 and stored, is replaced by that of the current communication partner (an originating host of the Host Resources MIB), and the response data is then transmitted. The process then ends.

When the answer in step S132 is negative, the process continues to step S126. In step S126, as described above, the activation signal is transmitted to the second NIC 120. In step S128, it is determined whether the activation of the second NIC 120 has been completed, i.e. whether the second NIC 120 has proceeded to the normal power status. When the activation of the second NIC 120 has not been completed, step S128 is repeated until it is completed. When the activation has been completed, the process proceeds to step S130 and the received data (SNMP data in this case) is transferred to the second NIC 120. The process then ends.

When it is determined that the received data is not UDP/IP data in step S122, the process proceeds to step S136, where it is determined whether the received data is a TCP/IP SYN signal. When the received data is a TCP/IP SYN signal, the process continues to step S138. When the received data is not a TCP/IP SYN signal, the process ends.

When the answer in step S136 is affirmative, the process proceeds to step S138 and the activation signal is transmitted to the second NIC 120 and power supply thereto is initiated. In step S140, the received data (TCP/IP SYN signal in this case) is stored in the storing unit 104 of the first NIC 100. In step S142, destination information of TCP/IP ACK/SYN data (session establishing response data) transferred from the second NIC 120 and stored is replaced by that of a current communication partner (which transmitted the TCP/IP SYN signal), and the response data is then transmitted. Accordingly, a session with the originating host of the SYN signal (PC 30 for example) is established.

In step S144, it is determined whether an TCP/IP ACK signal is received. When a TCP/IP ACK signal is not received, step S144 is repeated until it is received. When an ACK signal has been received, the process proceeds to step S146 and the received data (a TCP/IP ACK signal) is stored in the storing unit 104 of the first NIC 100.

In step S148, it is determined whether TCP/IP data has been received. When TCP/IP data has not been received, step S148 is repeated until it is received. When TCP/IP data has been received, the process proceeds to step S150 and the received data (TCP/IP data) is stored in the storing unit 104 of the first NIC 100.

In step S152, it is determined whether the activation of the second NIC 120 has been completed, i.e. whether the second NIC 120 has proceeded to the normal power status to perform the receiving process. When the activation of the second NIC 120 has been completed, the process continues to step S158.

When the activation of the second NIC 120 has not been completed, the process continues to step S154.

In step S154, destination information of TCP/IP ACK data (persistent connection control response data) in which Window Size=0, transferred from the second NIC 120 and stored, is replaced by that of a current communication partner (which has transmitted the TCP/IP data) and then the response data is transmitted. Accordingly, persistent connection control is performed.

In step S156, it is determined whether a Zero Window Probe of TCP/IP is received. When the Zero Window Probe is not received, step S156 is repeated until it is received. When the Zero Window Probe has been received, the process continues to step S152 and the previously described steps are again performed.

In contrast, in step S152, when the activation of the second NIC 120 has been completed, the process proceeds to step S158 and the signal of the TCP/IP SYN, the TCP/IP ACK, and data stored in the storing unit 104 are transferred (memory transfer) to the second NIC 120 via the bus 130. In step S160, it is determined whether the response data is received from the second NIC 120. When the response data has not been received from the second NIC 120, step S160 is repeated until it is received. When the response data has been received, the process proceeds to step S162, where it is determined whether the network data is received. When the network data has not been received, step S162 is repeated until it is received. When the network data has been received, the process proceeds to step S164 and the received network data is transferred to the second NIC 120. The process then ends.

Next, with reference to FIG. 5, a transmitting process of a command to the second NIC 120 by the MFP 3 is described. The process is performed at a prescribed timing in the MFP 3.

In step S200, it is determined whether a timer for proceeding to the low power consumption status has counted up to a prescribed time, i.e. whether over a set period of time has passed since no processing request to the MFP 3 is received. When the timer has counted up to the prescribed time, the process proceeds to step S202 and the command for proceeding to the low power consumption status, which indicates that the MFP 3 is to proceed to the low power consumption status, is transmitted to the second NIC 120. The MFP 3 then proceeds to the low power consumption status. The process then ends.

When the timer has not counted up to the prescribed time, the process proceeds to step S204 and it is determined whether an energy saving button of the operation unit 13 has been pressed by a user. When the energy saving button has not been pressed, the process ends. When the energy saving button has been pressed, the process proceeds to step S202 and the command for proceeding to the low power consumption status, which indicates that the MFP 3 is to proceed to the low power consumption status, is transmitted to the second NIC 120. The network MFP 3 then proceeds to the low power consumption status. The process then ends.

Next, with reference to FIG. 6, a transmitting process of a command and data to the first NIC 100 by the second NIC 120 is described. The process is performed at a prescribed timing in the second NIC 120.

In step S300, it is determined whether the command for proceeding to the low power consumption status has been received from the network MFP 3. When the command for proceeding to the low power consumption status has not been received, step S300 is repeated until it is received. When the command for proceeding to the low power consumption status has been received, the process continues to step S302

In step S302, a command for proceeding to the low power consumption, which indicates that the MFP 3 and second NIC 120 are to proceed to the low power consumption status, is transmitted to the first NIC 100. In step S304, the SNMP response data is transferred to the first NIC 100, and then in step S306, the TCP/IP ACK/SYN data is transferred to the first NIC 100. In step S308, the response history information stored in the history information storing unit 124 is transferred to the first NIC 100. The process then ends.

With reference to FIG. 7, a receiving process of a command and data from the second NIC 120 by the first NIC 100 is described. The process is performed at a prescribed timing in the first NIC 100.

In step S400, it is determined whether the command for proceeding to the low power consumption status has been received from the second NIC 120. When the command of the low power consumption status proceeding has not been received, step S400 is repeated until it is received. When the command of the low power consumption status proceeding has been received, the process continues to step S402.

In step S402, it is determined whether the response data has been received from the second NIC 120. When the response data has not been received, step S402 is repeated until it is received. When the response data has been received, the process continues to step S404.

In step S404, the SNMP response data received from the second NIC 120 is stored in the storing unit 104. In step S406, the TCP/IP ACK/SYN data received from the second NIC 120 is stored in the storing unit 104. In step S408, the response history information received from the second NIC 120 is stored in the storing unit 104. The process then ends.

Next, with reference to FIGS. 8 and 9, a receiving process of data from the first NIC 100 by the second NIC 120 is described. The process is performed at a prescribed timing in the second NIC 120.

In step S500, it is determined whether the status of the second NIC 120 is the low power consumption status. If the status of the second NIC 120 is not the low power consumption status, the process continues to step S502. If the status of the second NIC 120 is the low power consumption status, the process continues to step S516.

In step S502, it is determined whether data has been received from the first NIC 100. When data has not been received, step S502 is repeated until it is received. When data has been received, the process continues to step S504.

In step S504, it is determined whether the received data is UDP/IP data. If the received data is UDP/IP data, the process continues to step S506. If the received data is not UDP/IP data (i.e. TCP/IP data), the process continues to step S514.

In step S506, UDP/IP response data is generated with the TCP/IP protocol stack and transferred to the first NIC 100. In step S508, it is determined whether the received data is automatic response data. If it is automatic response data, the process continues to step S510. If it is not automatic response data, the process ends.

In step S510, a CRC of the received data is calculated. In step S512, the calculated CRC is stored in the history information storing unit 124 in association with the corresponding response data. The process then ends.

In contrast, in step S514, TCP/IP response data is generated with the TCP/IP protocol stack and transferred to the first NIC 100. In step S508, it is determined whether the received data is automatic response data. If the received data is automatic response data, the process continues to step S510. If the data is not automatic response data, the process ends.

In step S510, a CRC of the received data is calculated. The calculated CRC is stored in the history information storing unit 124 in association with the corresponding response data. The process then ends.

When it is determined that the second NIC 120 is in the low power consumption status in step S500, the process proceeds to step S516 and it is determined whether the activation signal has been transmitted from the first NIC 100. When the activation signal has not been transmitted, step S516 is repeated until it is transmitted. When the activation signal has been transmitted, the process continues to step S518.

In step S518, it is determined whether the activation of the second NIC 120 has been completed. When the activation has not been completed, step S518 is repeated until it is completed. When the activation has been completed, the process continues to step S520.

In step S520, it is determined whether data has been received from the first NIC 100. When data has not been received from the first NIC 100, step S520 is repeated until it is received. When data has been received from the first NIC 100, the process continues to step S522.

In step S522, it is determined whether the received data from the first NIC 100 is UDP/IP data. If the received data is UDP/IP data, the process continues to step S506 as described above. Here, the details following step S506, as already described above, are omitted. If the received data is not UDP/IP data, the process continues to step S524.

In step S524, it is determined whether a TCP/IP session has been established. When a TCP/IP session has been established, as illustrated in FIG. 9, the process continues to step S532. In contrast, when a TCP/IP session has not been established, the process continues to step S526.

In step S526, it is determined whether the received data from the first NIC 100 is a TCP/IP SYN signal. If the received data is a SYN signal, the process proceeds to step S528 and the received data (SYN signal in this case) is transferred to the TCP/IP protocol stack. The process then continues to step S524 and the steps that follow step S524 are again performed. If the received data is not a SYN signal, the process continues to step S530 and the steps that follow step S530 are again performed.

In step S530, it is determined whether the received data from the first NIC 100 is a TCP/IP ACK signal. If the received data is an ACK signal, the process proceeds to step S528 and the received data (ACK signal in this case) is transferred to the TCP/IP protocol stack. The process then continues to step S524 and the steps that follow step S524 are again performed. If the received data is not an ACK signal, the process continues to step S524 and the steps that follow step S524 are again performed.

In step S524, when it is determined that a TCP/IP session has been established, the process proceeds to step S532, as illustrated in FIG. 9, and it is determined whether a reception response command has been transmitted to the first NIC 100. When the reception response command has not been transmitted, the process proceeds to step S534 and the reception response command is transmitted to the first NIC 100. The process then ends. When the reception response command has been transmitted to the first NIC 100, the process continues to step S536.

In step S536, TCP/IP response data is generated with the TCP/IP protocol stack and transferred to the first NIC 100. In step S538, it is determined whether the received data from the first NIC 100 is automatic response data. If it is automatic response data, the process continues to step S540. If it is not automatic response data, the process continues to step S544.

In step S540, a CRC of the received data is calculated. In step S542, the calculated CRC is stored in the history information storing unit 124 in association with the corresponding response data. The process then ends.

In step S544, it is determined whether the activation of the MFP 3 is necessary for the received data. When the activation of MFP 3 is necessary, the process proceeds to step S546 and the activation signal is transmitted to the MFP 3. The process then ends. In contrast, when the activation of MFP 3 is not necessary, the process ends directly without the transmission of the activation signal.

Next, as illustrated in FIG. 10, a receiving process of a command and data from the second NIC 120 by the MFP 3 is described.

In step S600, it is determined whether the MFP 3 is in the low power consumption status. If the MFP 3 is not in the low power consumption status, the process continues to step S606. If the MFP 3 is in the low power consumption status, the process continues to step S602.

In step S602, it is determined whether the activation signal from the second NIC 120 has been transmitted. When the activation signal has not been transmitted, step S602 is repeated until it is transmitted. When the activation signal has been transmitted, the process continues to step S604.

In step S604, it is determined whether the activation of the MFP 3 has been completed. When the activation has not been completed, step S604 is repeated until it is completed. When the activation has been completed, the process continues to step S606.

In step S606, it is determined whether data has been received from the second NIC 120. When data has not been received from the second NIC 120, step S606 is repeated until it is received. When data has been received from the second NIC 120, the process continues to step S608. In step S608, the received data from the second NIC 120 is processed (print out, for example). The process then ends.

According to an embodiment, the NIC 10 comprises the first NIC 100 and the second NIC 120 separately, and while waiting, for example, the second NIC 120 proceeds to the low power consumption status and only the first NIC 100 is operating to perform a standby operation for the network data. Accordingly, the NIC 10 is in the low power consumption status, except the first NIC 100, while waiting for the network data. It is therefore possible to reduce power consumption of the NIC 10. Further, the first NIC 100, when the received data has been registered in the response history information, transmits a registered response data associated with the received data. In other words, when the activation of the second NIC 120 is not necessary, the first NIC 100 can respond to the received data on its side without activating the second NIC 120. Therefore, unnecessary activation of the second NIC 120 is limited so as to further reduce power consumption of the NIC 10.

Further, as described above, the first NIC 100, when the received data has been registered in the response history information, transmits the registered response data associated with the received data. Therefore, it is not necessary to analyze the received data or generate response data. Accordingly, a large-capacity memory to store such a TCP/IP protocol stack or a response processing program is not necessary. Furthermore, it is possible to use a CPU with a low frequency of operation clock and a relatively slow processing speed. As a result, it is possible to reduce power consumption of the first NIC 100. In contrast, when the received data has not been registered in the response history information, i.e. when the first NIC 100 cannot respond on its side, the second NIC 120 proceeds to the normal power status so as to process the received data. And the second NIC 120 analyzes the received data and performs the response processing according to the analysis result. As a result, according to an embodiment, it is possible to respond to the communication request from the network device at any time while further reducing power consumption.

Further, according to an embodiment, by calculating a CRC of the received data, comparing the calculated CRC with a CRC stored in the response history information, and determining whether these CRCs correspond to each other, it is determined whether the received data has already been registered in the response history information. In other words, it is possible to determine whether the received data has already been registered in the response history information without comparing the received data with the stored received data one by one. Accordingly, since the processing load for determining whether the received data has already been registered in the response history information is reduced, a CPU that has a lower frequency of operation clock and a slower processing speed can be used. Power consumption of the first NIC 100 can thereby be further reduced.

Further, according to an embodiment, when the second NIC 120 proceeds to the low power consumption status, the response history information stored in the history information storing unit 124 is transmitted to the first NIC 100. Therefore, the first NIC 100 can obtain only the response history information generated just before the second NIC 120 proceeds to the low power consumption status. Accordingly, after the second NIC 120 proceeds to the low power consumption status, it is possible to transmit response data to the network device based on the response history information obtained just before the second NIC 120 proceeds to the low power consumption status.

Also, according to an embodiment, when the session establishment request signal from the network device has been received and the activation signal has been transmitted, the first NIC 100 establishes the session with the network device, and, during the period of time in which the second NIC 120 proceeds to the normal power status, the first NIC 100 performs the persistent connection control which restricts data transmission of the network device while maintaining the session. Accordingly, a large-capacity memory to temporarily store the received data in the first NIC 100 is not necessary. Therefore, power consumption of the memory can be reduced. Further, when deactivating the persistent connection control, the session has already been established. Therefore, it is possible to initiate data communication quickly.

While preferred embodiments have been described, the present invention is not limited to these embodiments and may be modified in numerous ways. For example, in the above described embodiments, the NIC 10 comprises the first NIC 100 and the second NIC 120 separately. However, the first NIC 100 and the second NIC 120 do not have to be constructed in different boards separately. For example, both the first NIC 100 and second NIC 120 may be on a single board, or may be in a single IC chip.

While, in the above described embodiments, the 32-bit CRC has been used as an error-correction code for determining whether the received data corresponds to the automatic response data stored in the response history information, other error-correction codes, such as a Check Sum, may be used. Further, instead of registering the error-correction code, all the received data may be stored.

While, in the above described embodiments, the MFP 3 and the second NIC 120 have two power statuses, namely the low power consumption status (energy-saving status) and the normal power status, more power statuses can be included.

For example, a stand by status (stand by mode), which is an intermediate power status, may be included. In such a case, after proceeding from the low power consumption status to the waiting status and upon the completion of a data processing in the waiting status, the MFP 3 or the second NIC 120 may proceed back to the low power consumption status.

While, in the above described embodiments, a network interface apparatus has been applied to an MFP, it may be applied to other network devices. Further, in the above described embodiments, the PC has been described as a network device; however, the network device is not limited to a PC. For example, the network device may be a network MFP.

While the present invention has been described with respect to preferred embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A network interface apparatus comprising:
   a first communication control unit arranged to communicate with a network device via a network;
   a second communication control unit connected to the first communication control unit for communication therewith, the second communication control unit being configured to have a first power status and a second power status that has a lower power consumption than the first power status;
   the second communication control unit including:
   an accepting unit arranged to accept received data that has been received by the first communication control unit from the network device when in the first power status;
   an analyzing/generation unit arranged to analyze the received data accepted by the accepting unit and generate response data in response to the received data;
   a history information generation unit arranged to generate response history information by associating the received data with the response data corresponding to the received data; and
   an output unit arranged to output the response history information generated by the history information generation unit to the first communication control unit;
   the first communication control unit including:
   a receiving unit arranged to receive data via the network from the network device;
   a deciding unit arranged to determine a power status of the second communication control unit;
   a first storing unit arranged to store the response history information outputted by the output unit;
   a determining unit arranged to determine whether the received data has been registered in the response history information stored in the first storing unit when the received data is received by the receiving unit and the deciding unit determines that the second communication control unit is in the second power status; and
   a transmitting unit arranged to transmit the response data registered in the response history information in association with the received data when the determining unit determines that the received data has been registered in the response history information.

2. A network interface apparatus according to claim 1, wherein the history information generation unit is arranged to determine whether the received data is automatic response data and, when it is automatic response data, generates the response history information.

3. A network interface apparatus according to claim 2, wherein the history information generation unit is arranged to determine whether the received data is automatic response data and, when it is not automatic response data, does not generate the response history information.

4. A network interface apparatus according to claim 2, wherein the automatic response data includes SNMP (simple network management protocol) data.

5. A network interface apparatus according to claim 2, wherein the automatic response data includes ICMP (Internet control message protocol) data for transferring an IP error message or a control message.

6. A network interface apparatus according to claim 2, wherein the automatic response data includes ARP (address resolution protocol) data for inquiring about a MAC address.

7. A network interface apparatus according to claim 1, wherein the first communication control unit further comprises:
   a proceeding unit arranged to transmit a proceeding signal for causing the second communication control unit to proceed to the first power status when the determining unit determines that the received data has not been registered in the response history information.

8. A network interface apparatus according to claim 7, wherein the proceeding unit does not transmit the proceeding signal when the determining unit determines that the received data has been registered in the response history information.

9. The network interface apparatus according to claim 7, wherein the first communication control unit further comprises:
   a persistent connection control unit arranged to establish a session with the network device when the receiving unit receives a session establishing request signal from the network device and the proceeding unit transmits the proceeding signal, and performs a persistent connection control to restrict data transmission of the network device during a period of time in which the second communication control unit proceeds to the first power status, while maintaining the session.

10. The network interface apparatus according to claim 9, wherein the output unit outputs persistent connection control response data, which has been transmitted to the network device, to the first communication control unit during the persistent connection control;
    the first communication control unit further comprising:
    a fourth storing unit arranged to store the persistent connection control response data outputted by the output unit, and
    the persistent connection control unit generates response data by replacing the destination information of the persistent connection control response data stored in the fourth storing unit with that of a current communication partner when performing the persistent connection control.

11. A network interface apparatus according to claim 1, wherein
    the history information generation unit generates an error-correction code of the received data and the response history information by associating the generated error-correction code with the response data corresponding to the received data; and
    the determining unit calculates an error-correction code of a received data newly received by the receiving unit, and determines whether the newly received data has been registered in the response history information by comparing the calculated error-correction code with an error-correction code registered in the response history information stored in the storing unit.

12. A network interface apparatus according to claim 1, wherein the second communication control unit further comprises:
a history storing unit arranged to temporarily store the response history information generated by the history information generation unit; and
the output unit is arranged to output the response history information stored in the history storing unit to the first communication control unit when the second communication control unit proceeds to the second power status.

13. The network interface apparatus according to claim 1, wherein the second communication control unit proceeds from the first power status to the second power status when no communication is performed for more than a prescribed period of time.

14. A network interface apparatus according to claim 1, wherein the first communication control unit further comprises:
a bus transferring unit arranged to transfer the received data received by the receiving unit to the second communication control unit when the second communication control unit is in the first power status.

15. A network interface apparatus according to claim 14, wherein the first communication control unit further comprises:
a second storing unit arranged to store the received data received by the receiving unit during a period of time in which the second communication control unit proceeds from the second power status to the first power status; and
the bus transferring unit transfers the received data stored in the second storing unit to the second communication control unit when it is determined that the second communication control unit has proceeded from the second power status to the first power status.

16. A network interface apparatus according to claim 1, wherein the output unit outputs session establishing response data, which has been transmitted to the network device in response to the session establishing request from the network device, to the first communication control unit;
the first communication control unit further comprising:
a third storing unit arranged to store the session establishing response data outputted by the output unit; and
the transmitting unit replaces destination Information of the session establishing response data stored in the third storing unit with that of a current communication partner and transmits the session establishing response data when the receiving unit newly receives a session establishing request.

17. A network interface apparatus according to claim 1, wherein each of the first communication control unit and the second communication control unit further comprises:
a microprocessor, and the microprocessor of the first communication control unit has a lower frequency of operation clock than that of the second communication control unit.

18. A network interface apparatus according to claim 1, wherein each of the first communication control unit and the second communication control unit further comprises:
a RAM, and the RAM of the first communication control unit has a smaller capacity than the RAM of the second communication control unit.

19. A data communication method comprising:
receiving received data from a network device via a network;
analyzing the received data and generating response data in response to the received data when in a first power status;
generating response history information by associating the received data with the response data corresponding to the received data;
storing the response history information;
deciding whether a power status is the first power status or a second power status that has a lower power consumption than the first power status;
determining whether the received data has been registered in the response history information when in the second power status; and
transmitting response data registered in the response history information in association with the received data to the network device via the network, when the received data has been registered in the response history information.

20. The data communication method according to claim 19, wherein in the history information generating step, the response history information is generated when the received data is automatic response data, and is not generated when the received data is not automatic response data.

* * * * *